United States Patent
Hayashi

(10) Patent No.: US 8,671,528 B2
(45) Date of Patent: Mar. 18, 2014

(54) ASSEMBLING CONSTRUCTION OF CLIP TO MOUNTABLE MEMBER

(75) Inventor: Shinichiro Hayashi, Kanagawa (JP)

(73) Assignee: Piolax, Inc., Yookhama-Shi, Kanagawa (JP)

( * ) Notice: Subject to any disclaimer, the term of this patent is extended or adjusted under 35 U.S.C. 154(b) by 0 days.

(21) Appl. No.: 13/377,506

(22) PCT Filed: May 25, 2010

(86) PCT No.: PCT/JP2010/058798
§ 371 (c)(1),
(2), (4) Date: Dec. 9, 2011

(87) PCT Pub. No.: WO2010/143531
PCT Pub. Date: Dec. 16, 2010

(65) Prior Publication Data
US 2012/0074280 A1   Mar. 29, 2012

(30) Foreign Application Priority Data
Jun. 12, 2009   (JP) ................................ 2009-141423

(51) Int. Cl.
*A44B 1/04*   (2006.01)
(52) U.S. Cl.
USPC ........... 24/297; 24/898; 411/508; 248/223.41
(58) Field of Classification Search
USPC ........ 248/223.41; 24/292, 297, 289; 411/508; 52/716.6, 716.7, 716.8, 716.5
See application file for complete search history.

(56) References Cited

U.S. PATENT DOCUMENTS

| 2,598,776 | A | * | 6/1952 | Flora ................................ 24/295 |
| 4,172,000 | A | * | 10/1979 | Horike et al. .................. 156/108 |
| 4,716,633 | A | * | 1/1988 | Rizo ................................ 24/453 |
| 5,195,793 | A | * | 3/1993 | Maki .............................. 293/155 |
| 5,507,610 | A | * | 4/1996 | Benedetti et al. ............. 411/339 |
| 5,639,522 | A | * | 6/1997 | Maki et al. ....................... 428/31 |
| 6,253,423 | B1 | * | 7/2001 | Friedrich et al. ................ 24/293 |
| 6,394,695 | B1 | * | 5/2002 | Chausset ....................... 403/397 |

(Continued)

FOREIGN PATENT DOCUMENTS

| CN | 1124826 A | 6/1996 |
| CN | 1465869 A | 1/2004 |

(Continued)

OTHER PUBLICATIONS

Chinese Notification of the Second Office Action dated Nov. 20, 2013, with English-language translation.

*Primary Examiner* — Terrell McKinnon
*Assistant Examiner* — Daniel J Breslin
(74) *Attorney, Agent, or Firm* — McGinn IP Law Group, PLLC

(57) ABSTRACT

An assembling construction assembles a mountable member to a support member by holding a head portion of a clip on a mounting seat of the mountable member while securely fitting a leg portion in a mounting hole in the support member, the mounting seat has an instruction groove and guide grooves, the head portion of the clip has a first flange portion beam-like strip-shaped elastic pieces and which are brought into press contact with end portions of the guide grooves and stopper projections which are adapted to be brought into engagement with the end portions of the guide grooves when the clip is attempted to be shifted largely relative to the mounting seat.

13 Claims, 10 Drawing Sheets

(56) References Cited

U.S. PATENT DOCUMENTS

| | | | |
|---|---|---|---|
| 6,406,242 B1 * | 6/2002 | Gordon | 411/508 |
| 6,715,185 B2 * | 4/2004 | Angellotti | 24/297 |
| 7,114,221 B2 * | 10/2006 | Gibbons et al. | 24/289 |
| 7,152,281 B2 * | 12/2006 | Scroggie | 24/297 |
| 7,165,371 B2 * | 1/2007 | Yoyasu | 52/716.5 |
| 7,272,873 B2 * | 9/2007 | Nessel et al. | 24/297 |
| 7,337,505 B1 * | 3/2008 | Scroggie et al. | 24/297 |
| 7,481,474 B2 * | 1/2009 | Higgins et al. | 296/1.08 |
| 7,669,295 B2 * | 3/2010 | Wakabayashi | 24/297 |
| 7,698,787 B2 * | 4/2010 | Scroggie et al. | 24/297 |
| 7,757,997 B2 * | 7/2010 | Smutny et al. | 248/71 |
| 7,904,994 B2 * | 3/2011 | Girodo et al. | 24/297 |
| 7,954,205 B2 * | 6/2011 | Xueyong et al. | 24/289 |
| 7,966,702 B2 * | 6/2011 | Horimatsu et al. | 24/297 |
| 8,046,880 B2 * | 11/2011 | Katoh et al. | 24/458 |
| 8,047,475 B2 * | 11/2011 | Fukumoto et al. | 248/73 |
| 8,322,001 B2 * | 12/2012 | Ehrhardt et al. | 24/289 |
| 2002/0043041 A1 * | 4/2002 | Yoyasu | 52/716.5 |
| 2003/0159256 A1 * | 8/2003 | Clarke | 24/297 |
| 2004/0265094 A1 * | 12/2004 | Gordon | 411/508 |
| 2008/0260454 A1 * | 10/2008 | Girodo et al. | 403/11 |
| 2009/0188086 A1 * | 7/2009 | Okada et al. | 24/297 |

FOREIGN PATENT DOCUMENTS

| | | |
|---|---|---|
| CN | 1628218 A | 6/2005 |
| CN | 101334057 A | 12/2008 |
| JP | 5-52316 | 7/1993 |
| JP | 07-004410 A | 1/1995 |
| JP | 7-332322 A | 12/1995 |
| JP | 3557536 B2 | 5/2004 |

* cited by examiner

ASSEMBLING CONSTRUCTION OF CLIP TO MOUNTABLE MEMBER

TECHNICAL FIELD

The present invention relates to an assembling construction for assembling a clip to a mountable member, the clip fastening the mountable member to a support member.

BACKGROUND ART

A clip having a head portion and a leg portion is used, for example, in fastening a mountable member such as a trim board to a support member such as a body panel of a motor vehicle. For example, the mountable member has a mounting seat to which the head portion of the clip is assembled. The head portion of the clip is assembled to the mounting seat, and the leg portion is inserted in a mounting hole in the support member whereby the mountable member is fastened to the support member via the clip.

Meanwhile, there may be unavoidable manufacturing dimension errors between mountable members and support members. When a mountable member is a longitudinally elongated part such as a side spoiler, dimensional variation becomes relatively large due to thermal expansion. Thus, clips are assembled to mounting seats with such a slight play as to allow them to be shifted for positional adjustment, so that respective leg portions of the clips can be inserted into corresponding mounting holes in the support member.

However, when the positions of the clips vary within a range defined by the play, the registration of the leg portions with the corresponding mounting hole becomes difficult in inserting the leg portions in the mounting holes, and the assembling efficiency is deteriorated.

Thus, the applicant (in US, assignee) of this patent application has proposed a construction provided with a centering action which moves leg portions of clips to centers of corresponding mounting seats while permitting the individual clips to have a slight play. Patent Literature 1 discloses a mounting construction for mounting a part with a mounting seat which opens in one side on a panel by use of a clip. The clip includes two flanges. A pair of engagement grooves having a V-shape is formed symmetrically on a seat surface side of the mounting seat. A pair of elastic arms having a projection is formed on either of the two flanges so as to slidably engage with the engagement grooves. The respective projections on the elastic arms are guided to central portions at bends of the corresponding V-shaped engagement grooves.

In that construction, the projections on the elastic arms of the clips enter the V-shaped engagement grooves on the mounting seat to be held therein so as to be guided to the central portions at the bends of the engagement grooves. When the elastic arms are deflected by an external force to thereby force the clips out of the central positions thereof, the projections perform a cam-like movement within the corresponding engagement grooves by an elastic restoring force of the elastic arms to thereby center the clips back in their original positions.

RELATED ART LITERATURE

Patent Literature

Patent Literature 1: JP-3557536-B

SUMMARY OF THE INVENTION

Problem that the Invention is to Solve

In Patent Literature 1, however, since the engagement grooves formed on the mounting seat have the "V-shape" which extend obliquely largely, a relatively large space is required, and the mounting seat is enlarged in size.

In addition, while the elastic arms of the clips provide the centering force with respect to a movement parallel to the mounting seat by its deflection, the elastic arms cannot restrict the looseness in a vertical direction to the mounting seat, and it may result in an unstable assemblage.

An object of the invention is to provide an assembling construction of a clip to a mountable member which ensures that the clip is centered in a mounting seat, which enables the mounting seat to be formed compact and which enables the clip to be assembled to the mounting seat without any looseness.

Means for Solving the Problem

The present invention provides an assembling construction of a clip to a mountable member for fastening the mountable member to a support member by holding a head portion of the clip on a mounting seat of the mountable member while securely fitting a leg portion of the clip in a mounting hole in the support member, wherein the mounting seat has an introduction groove which is opened at one end for insertion of the clip and a guide groove which is a narrow elongated hole and is disposed parallel to the introduction groove, wherein the head portion of the clip has a first flange portion which is brought into abutment with one side of the mounting seat, a neck portion which is inserted into the introduction groove and a second flange portion which is brought into abutment with an opposite side to the one side of the mounting seat, wherein the leg portion extends from an opposite side of the second flange portion to the neck portion side, and wherein the first flange portion has an strip-shaped elastic piece which is supported at both ends thereof so as to be disposed along the guide groove, and when the neck portion is inserted into the guide groove, is bent in the direction of a surface to be inserted into the guide groove and to be brought into press contact with both end portions of the guide groove.

It is preferable that, in the assembling construction, one or more of the guide groove is formed on each side of the guide groove in the mounting seat, and the elastic piece is formed in plurality correspondingly with the guide grooves.

It is preferable that, in the assembling construction, the neck portion of the clip has a sectional shape which extends long along a direction in which the introduction groove extends.

It is preferable that, in the assembling construction, both lateral sides of the stopper projection, which face both lateral sides of the guide groove, are formed into tapering surfaces so as to approach each other in a direction in which the stopper projection projects.

It is preferable that, in the assembling construction, portions of the mounting seat on both sides of the introduction groove are formed into tapering walls which gradually reduce their thicknesses towards an opened direction of the introduction groove.

Advantage of the Invention

According to the invention, the neck portion of the clip is inserted into the introduction groove in the mounting seat, the first flange portion is brought into abutment with the one side of the mounting seat, and the second flange portion is brought into abutment with the opposite side of the mounting seat, whereby the clip can be assembled to the mounting seat. As this occurs, the elastic pieces which are supported on the first flange portion are inserted into the guide grooves in the mounting seat. Thus, when the clip is offset relative to longitudinally middle portions of the guide grooves, end portions of the elastic pieces which are situated in a direction in which the clip is so offset are strongly brought into press contact with end portions of the guide grooves, and a centering action is generated by a press contact force generated then, whereby the clip is returned to a substantially central portion of the guide groove. Because of this, when clips like the clip are mounted in plural locations on the mountable member, respective positions of the clips are automatically corrected by the centering action. Therefore, the registration of the clips with corresponding mounting holes in the support member is facilitated, thereby improving the clip insertion work.

Since the end portions of the elastic pieces are brought into press contact with the end portions of the guide grooves, the looseness of the clip in a vertical direction to the mounting seat can also be prevented, thereby stably holding the clip on the mounting seat.

When the clips are mounted on mounting seats provided in the plural locations on the mountable member and leg portions of the clips are inserted in corresponding mounting holes in the support member in such a state that the clips are returned to the longitudinal centers of the guide grooves by the centering force, even in the event that the leg portions of the clips are not accurately registered with centers of the mounting holes due to dimensional errors between the mountable member and the support member, the clips move as required against the centering force. Thus, the clips can be moved so as to be registered with the corresponding mounting holes.

Since the guide grooves with which the elastic pieces are brought into press contact are formed parallel to the introduction groove in the mounting seat, unlike the "V-shaped" engagement grooves in Patent Literature 1, the width of the mounting seat can be narrowed, thereby reducing the size thereof.

MODE FOR CARRYING OUT THE INVENTION

Figure 8:
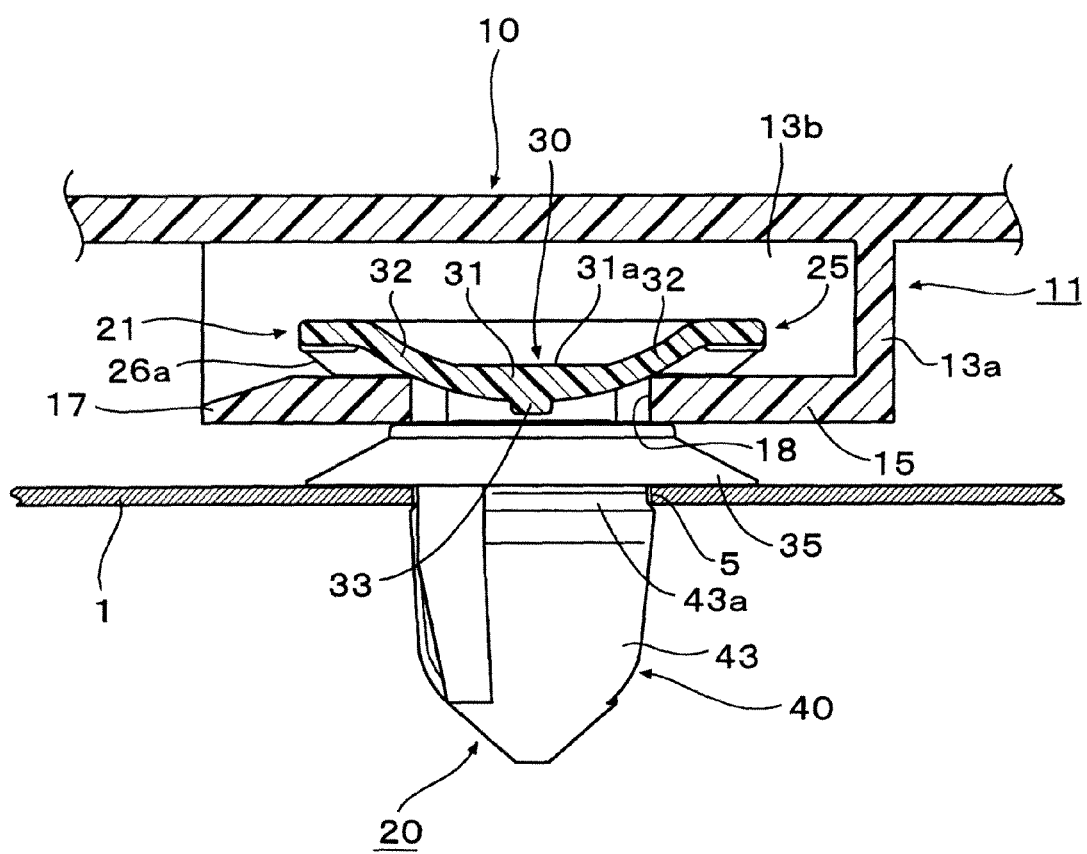
FIG. 8 is an explanatory drawing showing state in which the mountable member is mounted on support member by use of the assembling construction.

As FIG. 8 shows, a clip 20 is used, for example, to mount a mountable member 10 such as a garnish or trim board on a support member 1 such as a body panel of a motor vehicle, and has a head portion 21 and a leg portion 40. The head portion 21 is inserted into a plate-shaped mounting seat 15 which is formed on the mountable member 10 to be assembled thereto, while the leg portion 40 is inserted into a mounting hole 5 formed in the support member 1 for engagement therewith, whereby the mountable member 10 is mounted on the support member 1 via the clip 20.

Hereinafter, referring to FIGS. 1 to 8, one embodiment of an assembling construction of a clip to a mountable member according to the invention will be described.

Firstly, referring to FIGS. 1 and 4 to 8, the construction of a mountable member 10 will be described. In this embodiment, plural pedestals 11 each having a plate-shaped mounting seat 15 are provided on a rear side of the mountable member 10, and clips 20 are assembled individually on the pedestals 11.

The pedestal 11 includes a frame-shaped wall 13 having a substantially U-shape when viewed from thereabove and a long plate-shaped mounting seat 15. The frame-shaped wall 13 includes a rear wall 13a which is erected from a rear side of the mountable member 10 and a pair of lateral walls 13b, 13b which are connected to both ends of the rear wall 13a at right angles thereto and which extend a certain length in parallel to each other. The mounting seat 15 is connected to a bottom side of the frame-shaped wall 13 and is disposed parallel to and spaced a certain distance apart from the rear side of the mountable member 10.

A first flange portion 25 of the clip 20 is brought into abutment with an inner side (one side) of the mounting seat 15 which lies closer to the mountable member 10. In addition, a second flange portion 35 of the clip 20 is brought into abutment with an outer side the mounting seat 15 which is opposite to the inner side (opposite side).

An introduction groove 16 is formed a certain length in a transversely central position in the mounting seat 15. This introduction groove 16 is opened at one end thereof which lies at a front end of the pedestal 11 and communicates with an exterior portion of the pedestal 11, so that a neck portion 22 of the clip 20 is inserted into the introduction groove 16. As FIGS. 1, 4, 5A and 5B show, portions of the mounting seat 15 which are situated on both sides of an opening portion in the introduction groove 16 are formed into tapering walls 17, 17 which gradually reduce their thicknesses towards the opened direction of the introduction groove 16. In this embodiment, inner sides of the mounting seat 15 on the both sides of the introduction groove 16 are formed into the tapering walls 17, 17. Inner surfaces 17a, 17a of the introduction groove 16 around the opening portion thereof gradually move further away from each other so as to form a substantially inverted trapezoidal space therebetween when viewed from thereabove. Thus, this configuration facilitates the introduction of the neck portion 22 of the clip 20 into the introduction groove 16.

In this embodiment, guide grooves 18, 18 are formed in the mounting seat 15 on the both sides of the introduction groove 16 so as to be disposed parallel to the introduction groove 16. Unlike the introduction groove 16, the guide groove 18 has a narrow elongated-hole-like (slit-like) shape which is enclosed along a full circumference with a wall. Both end portions 32, 32 of an elastic piece 30 of the clip 20 are brought into press contact with both longitudinal ends of the guide groove 18, respectively.

The shape of the mounting seat 15 is not limited to the above-described shape, and hence, any shape may be adopted therefor, as long as an introduction groove 16 which is opened at one end and narrow elongated guide grooves 18 can be formed therein.

Next, the clip 20 will be described which is assembled to the mounting seat 15.

Figure 2A:
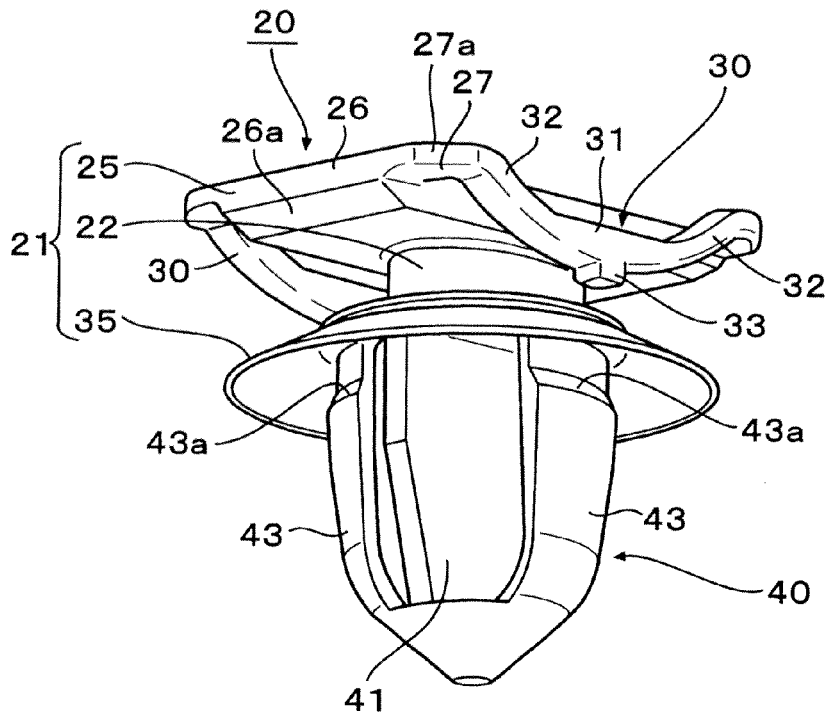
FIGS. 2A and 2B show the clip, FIG. 2A being an enlarged perspective view, FIG. 2B being an enlarged perspective view from a direction different from that in FIG. 2A.
Figure 2B:
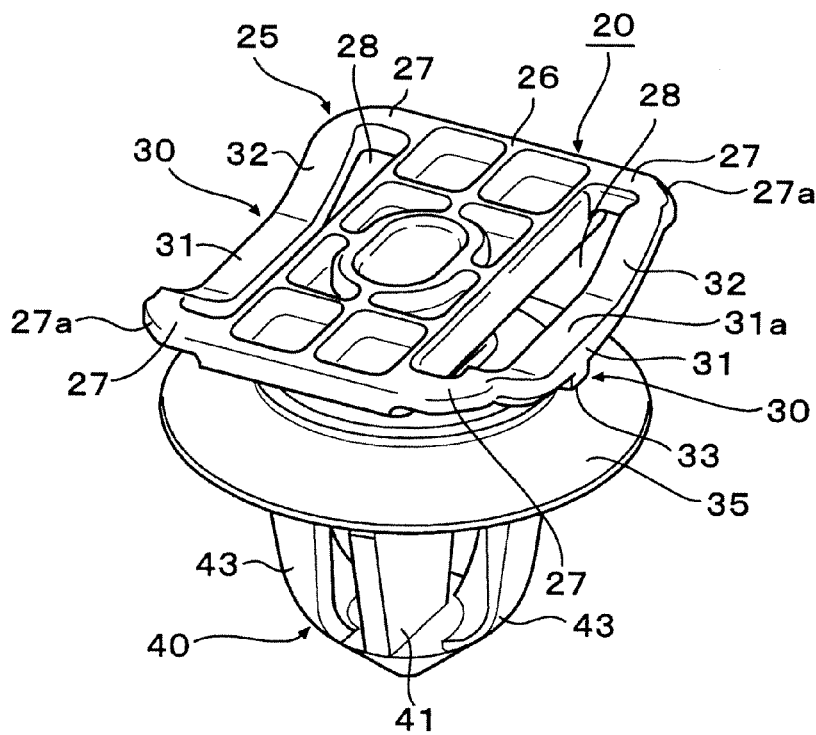

As FIGS. 2A and 2B show, the clip 20 has the head portion 21 and the leg portion 40 which is continuous with the head portion 21. The head portion 21 includes the first flange portion 25 which has a substantially rectangular plate-like shape, the neck portion 22 which extends a certain length from a central portion of a rear side of the first flange portion 25 and the second flange portion 35 which expands radially into a circular disk-like shape from an outer circumference of the leg portion 40 side of the neck portion 22 and further expands into an umbrella-like shape towards the leg portion 40 at a circumferential edge thereof. The first flange portion 25 is brought into abutment with an inner side of the mounting seat 15 and the second flange portion 35 is brought into abutment with an outer side of the mounting seat 15 by inserting the neck portion 22 into the introduction groove 16. Thus, the mounting seat 15 is held between the upper and lower flange portions 25, 35, whereby the clip 20 is assembled to the mounting seat 15.

Figure 3:
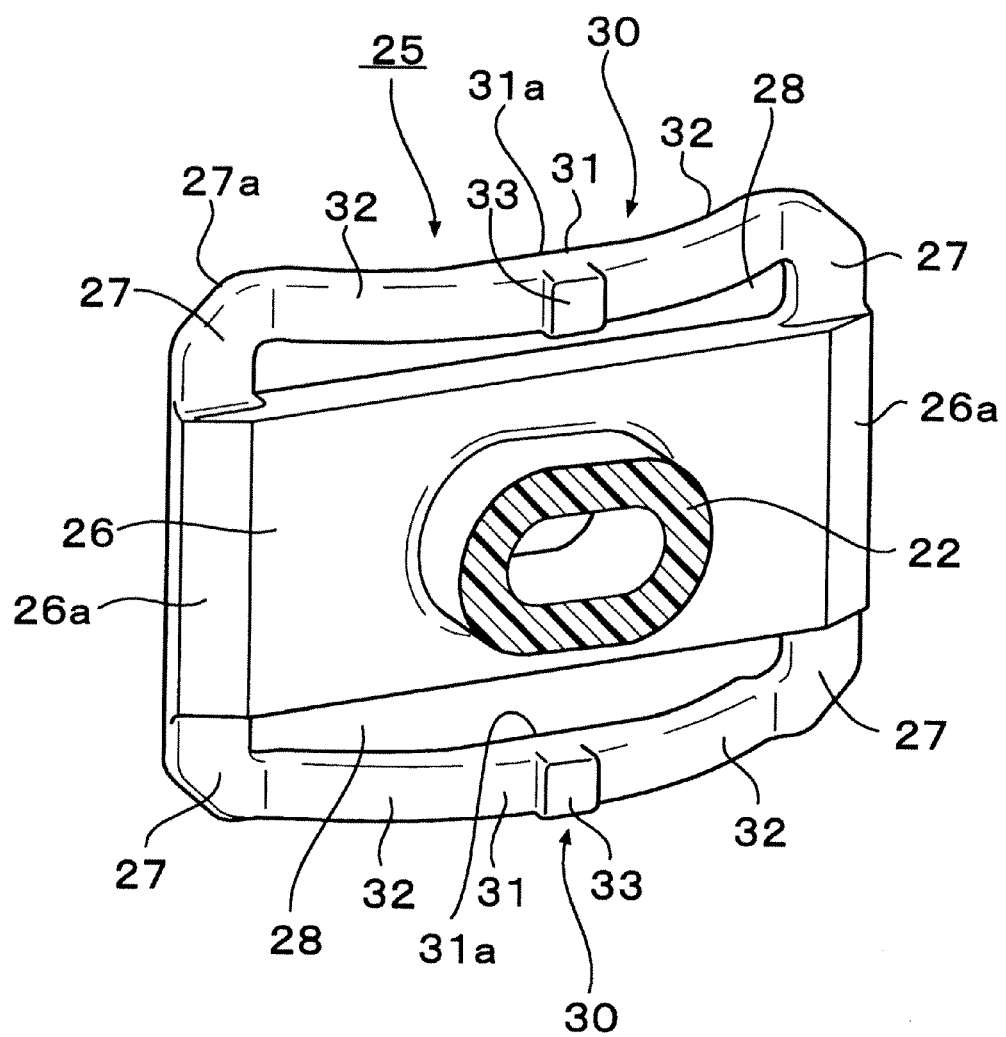
FIG. 3 is an enlarged perspective view of a first flange portion of the clip.
Figure 5A:
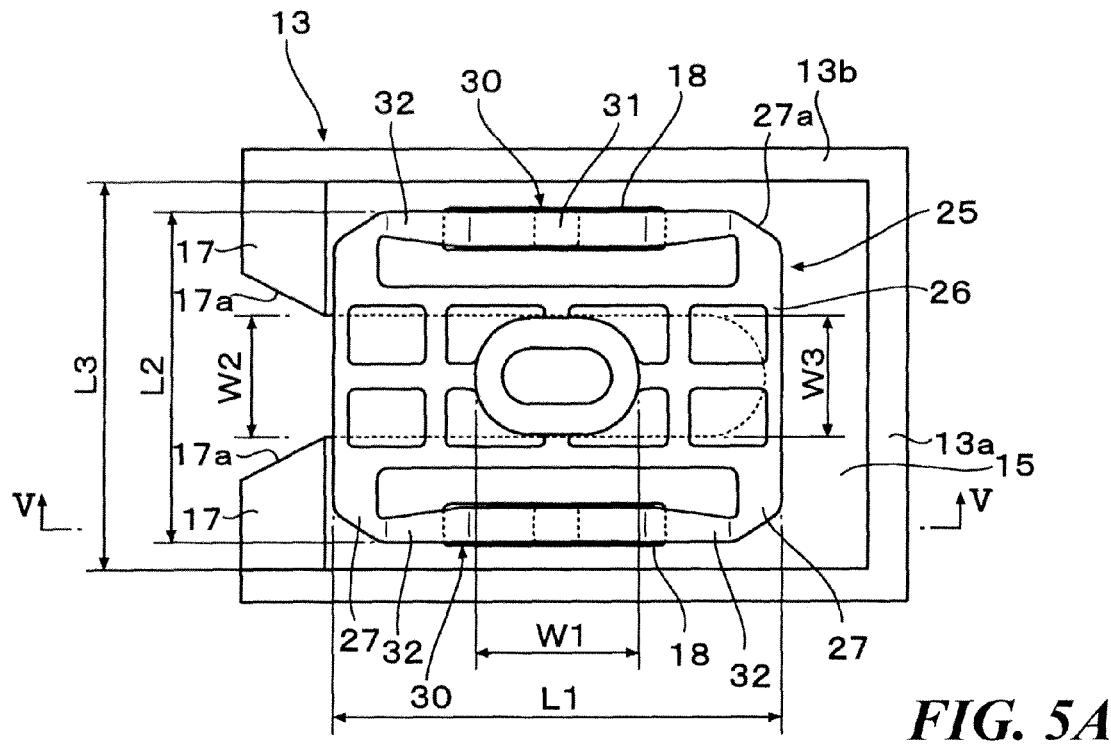
FIGS. 5A and 5B show a state in the clip is mounted in a substantially center of the mounting seat, FIG. 5A being a plan view of the state, FIG. 5B being a partially sectional view taken along the line V-V in FIG. 5A.

As FIG. 3 shows, the neck portion 22 has a sectional shape which extends long in a direction in which the introduction groove 16 extends. In this embodiment, the neck portion 22 has a narrow elongated cylindrical shape which extends a certain length in one direction and of which longitudinal end portions are rounded into an arc-like shape. As FIG. 5A shows, a width W1 of the neck portion 22 which extends along a longer side thereof is larger than a width W3 of the introduction groove 16. A width W2 of the neck portion 22 which extends along a shorter side thereof almost matches the width W3 of the introduction groove 16. Consequently, the inserting direction of the neck portion 22 into the introduction groove 16 is restricted, whereby an erroneous insertion of the neck portion 22 into the introduction groove 16 is prevented.

Next, the first flange portion 25 will be described. The first flange portion 25 has a substantially rectangular plate-like shape as a whole. Elastic pieces 30 each having a strip-like shape (a narrow elongated belt-like shape) are formed along both side portions of the first flange portion 25. These elastic pieces 30 are each supported by the first flange portion 25 at both ends thereof and are each bent in the direction of a surface thereof so that the elastic piece 30 extends along the guide groove 18 and is inserted into the guide groove 18 when the neck portion 22 is inserted into the introduction groove 16. A stopper projection 33 is formed on a side of a longitudinally central portion of each elastic piece 30 which lies in a direction in which the elastic piece 30 is inserted into the guide groove 18.

That is, as FIGS. 2A, 2B, 3, 5A and 5B show, the first flange portion 25 has a long plate-like shape on a front side of which plural recess portions are formed and has a base member 26 to which the neck portion 22 is connected in a center of a rear side thereof. Tapering surfaces 26a, 26a are formed on rear sides of longitudinal end portions of the base member 26, and these tapering surfaces 26a, 26a are inclined so as to gradually reduce the thickness of the base member 26 towards respective distal ends of the end portions (refer to FIG. 3). These tapering surfaces 26a, 26a facilitates the introduction of the first flange portion 25 on to the inner side of the mounting seat 15 together with the tapering walls 17 which are formed on the mounting seat 15.

Support pieces 27, 27 are provided to project transversely outwards from longitudinal ends of both longitudinal side portions of the base member 26 so as to be at right angles to the base member 26 (refer to FIG. 3). These support pieces 27, 27 are thinner than the base member 26. In total, four support pieces 27 are provided; two on each side portion of the base member 26. The elastic piece 30 is supported by the two support pieces 27, 27 at both ends thereof. Thus, the deflectable strip-shaped elastic pieces 30, 30 are disposed along longitudinal side portions of the first flange portion 25 via spaces 28, 28. The support pieces 27, 27 which support the ends of the elastic piece 30 are made thinner than the thickness of the base member 26, whereby the flexibility of the elastic piece 30 is increased.

End portions 32, 32 of the elastic piece 30 are connected to the support pieces 27, 27, respectively, and a central portion 31 thereof is disposed so as to project in the direction in which the elastic piece 30 is inserted into the guide groove 18. Thus, when viewed from a side thereof, the elastic piece 30 has a bow-like curved shape which is convex in the direction in which the elastic piece 30 is inserted into the guide groove 18.

Figure 5B:
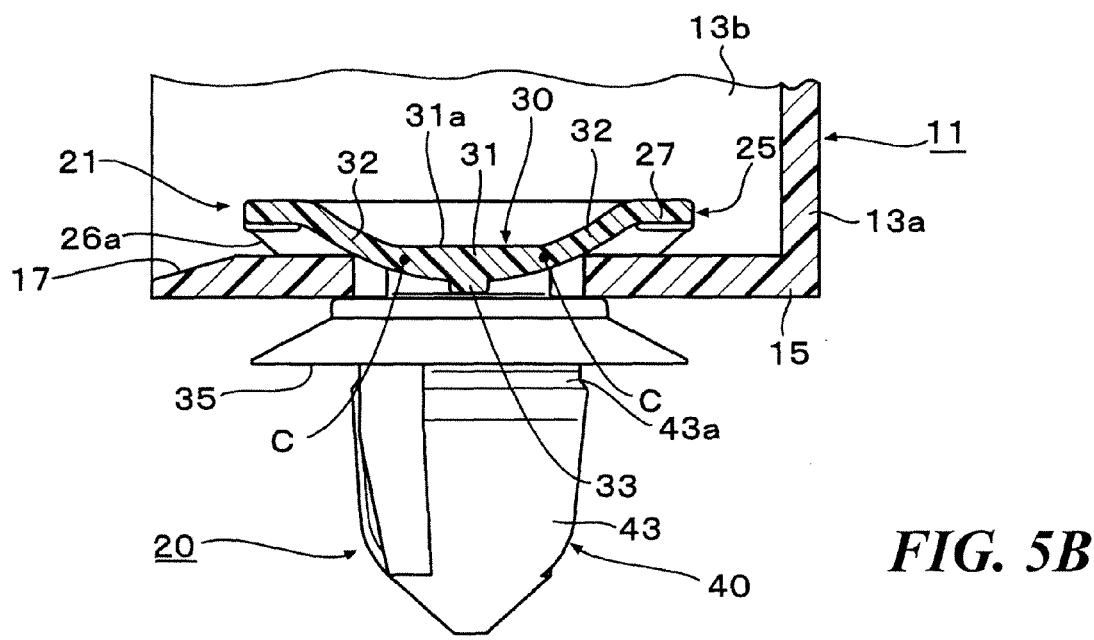

When the clip 20 is assembled to the mounting seat 15, the elastic pieces 30, 30 are inserted into the corresponding guide grooves 18, 18, and the end portions 32, 32 of the elastic pieces 30, 30 are pressed against corresponding end portions of the guide grooves 18 (refer to FIG. 5B). Consequently, as FIGS. 6A to 7B show, when the clip 20 is offset with respect to longitudinally middle positions of the guide grooves 18, the elastic pieces 30 which are brought into press contact with the end portions of the guide grooves 18 which are situated in the direction in which the clip 20 is offset are pressed more strongly and are deflected to be deformed. Then, centering forces are generated to act on the elastic pieces 30 so as to push them back towards the longitudinally middle positions of the guide grooves 18 by virtue of elastic forces of the elastic pieces 30 (refer to arrows in FIG. 6B, FIG. 7B).

In this embodiment, outer sides of the central portion 31 and the end portions 32, 32 which are situated in the direction in which the elastic piece 30 is inserted into the guide groove 18 work together to draw a continuous curve with a certain radius of curvature. An inner side of the central portion 31 which is situated on an opposite side to the direction in which the elastic piece 30 is inserted into the guide groove 18 is formed into a flat plane 31a which is parallel to and at almost the same height as the rear side of the base member 26. Inner sides of the end portions 32, 32 are formed into curved planes which are curved with almost the same radius of curvature as that of the outer sides thereof (refer to FIGS. 4 and 5B).

In this way, the elastic piece 30 has the curved shape which is convex towards the guide groove 18 as a whole. Therefore, for example, compared with an elastic piece which is bent into a V-shape, the elastic piece 30 can be bent more largely towards the direction in which the elastic piece 30 is inserted into the guide groove 18. Therefore, the elastic piece 30 can be strongly brought into press contact with the end portions of the guide groove 18, whereby the press contact force is improved so as to enhance the centering force.

Figure 4:
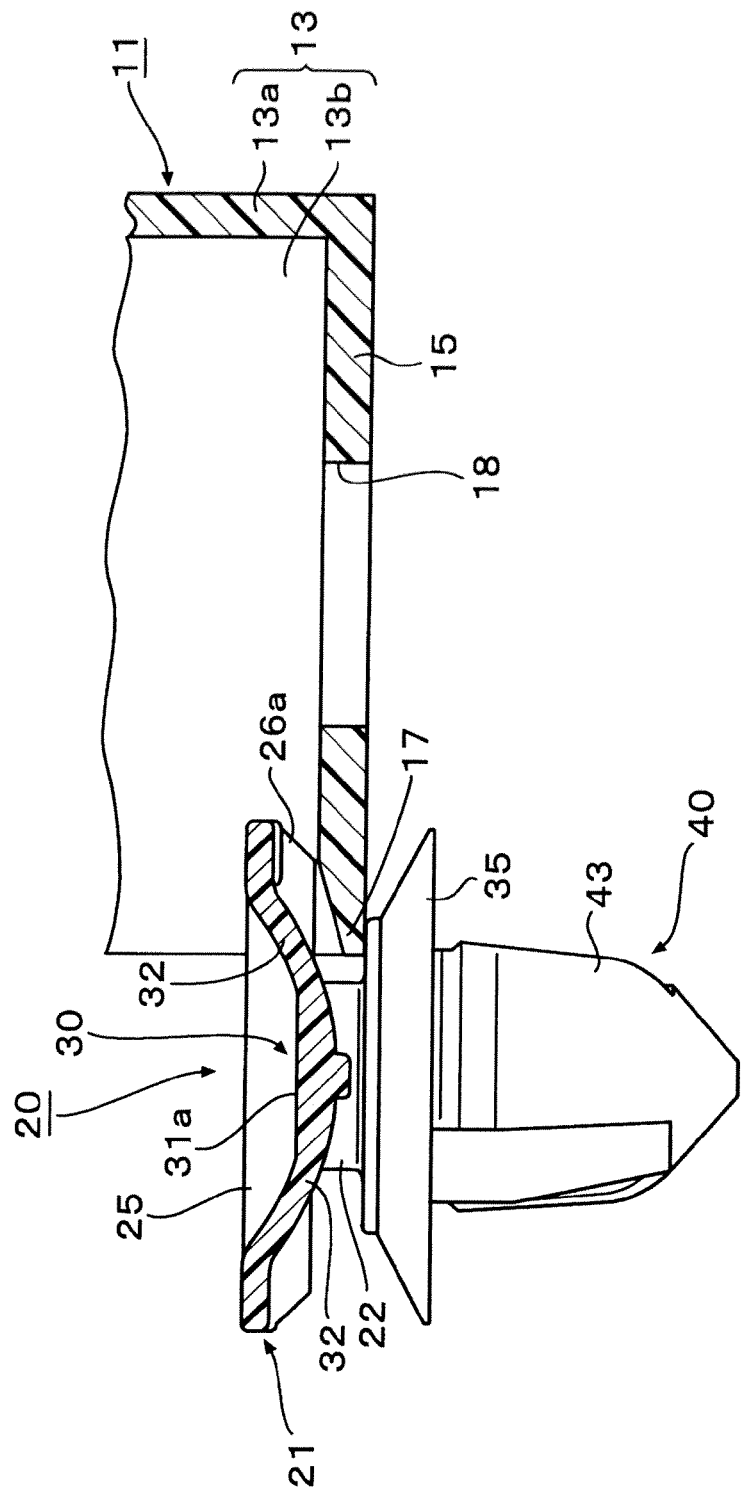
FIG. 4 is an explanatory drawing which explains an assemblage of the clip to a mounting seat in the assembling construction according to the invention.

As FIGS. 4 and 5B show, in the elastic piece 30, the central portion 31 is formed thicker than the end portions 32, 32, and the elastic piece 30 is made to deflect easily about portions where the thickness of the elastic piece 30 changes, that is, connecting portions C, C between the central portion 31 and the end portions 32, 32 (refer to FIG. 5B) as starting points of deflection. In this way, by providing the starting points C, C of deflection on the elastic piece 30, the elastic piece 30 is made to be deflected at the end portions 32, 32, whereby the centering force can be enhanced further.

Chamfering 27a at a certain angle (refer to FIGS. 2A, 2B, 3) is applied to four corner portions of the first flange portion 25 having the long plate-like shape, that is, external sides of the support pieces 27. As FIG. 5A shows, a longitudinal length L1 of the first flange portion 25 is larger than a space L3 defined between inner sides of the pair of lateral walls 13b, 13b of the pedestal 11, and a transverse length L2 of the first flange portion 25 is smaller than the space L3. Consequently, an erroneous insertion of the first flange portion 25 between the pair of lateral walls 13b, 13b is prevented, and this ensures together with the insertion of the neck portion 22 into the introduction groove 16 that an erroneous assemblage of the clip 20 to the mounting seat 15 is prevented.

The stopper projection 33 is provided to project from the side of the central portion 31 of the elastic piece 30 which lies in the direction in which the elastic piece 30 is inserted into the guide groove 18. This stopper projection 33 is adapted to be inserted into the guide groove 18 when the clip 20 is assembled to the mounting seat 15. As FIG. 5B shows, this stopper projection 33 is inserted into the guide groove 18 together with the elastic piece 30. As indicated by imaginary lines in FIGS. 6B and 7B, when the clip 20 is attempted to be shifted largely relative to the mounting seat 15, the stopper projection 33 is brought into engagement with the end portion of the guide groove 18 so as to restrict a further shift of the clip 20.

The leg portion 40 of the clip 20 extends from a side of the second flange portion 35 which is opposite to the neck portion 22. Specifically speaking, as FIGS. 2A and 2B show, the leg portion 40 includes a plate-shaped shank portion 41 which is suspended from the center of a rear side of the second flange portion 35 and a pair of engagement pieces 43, 43 which are disposed to face external sides of the shank portion 41 and which are connected to a distal end of the shank portion at one ends and are connected to the rear side of the second flange portion 35 at the other ends thereof. An engagement step portion 43a is formed along an outer circumference of the second flange portion 35 side of each engagement piece 43, and this engagement step portion 43a is adapted to be brought into engagement with a circumferential edge of a rear side of the mounting hole 5 in the support member 1. The configuration of the leg portion 40 is not limited to the one described above, and hence, the leg portion 40 may be made up of a plate-shaped stem and a pair of locking legs which extend from distal ends of both sides of the stem as of arms of an anchor, as long as the leg portion 40 can be fitted in the mounting hole 5 in the support member 1 for engagement therein.

Next, a method for using the assembling construction of the invention will be described.

Figure 1:
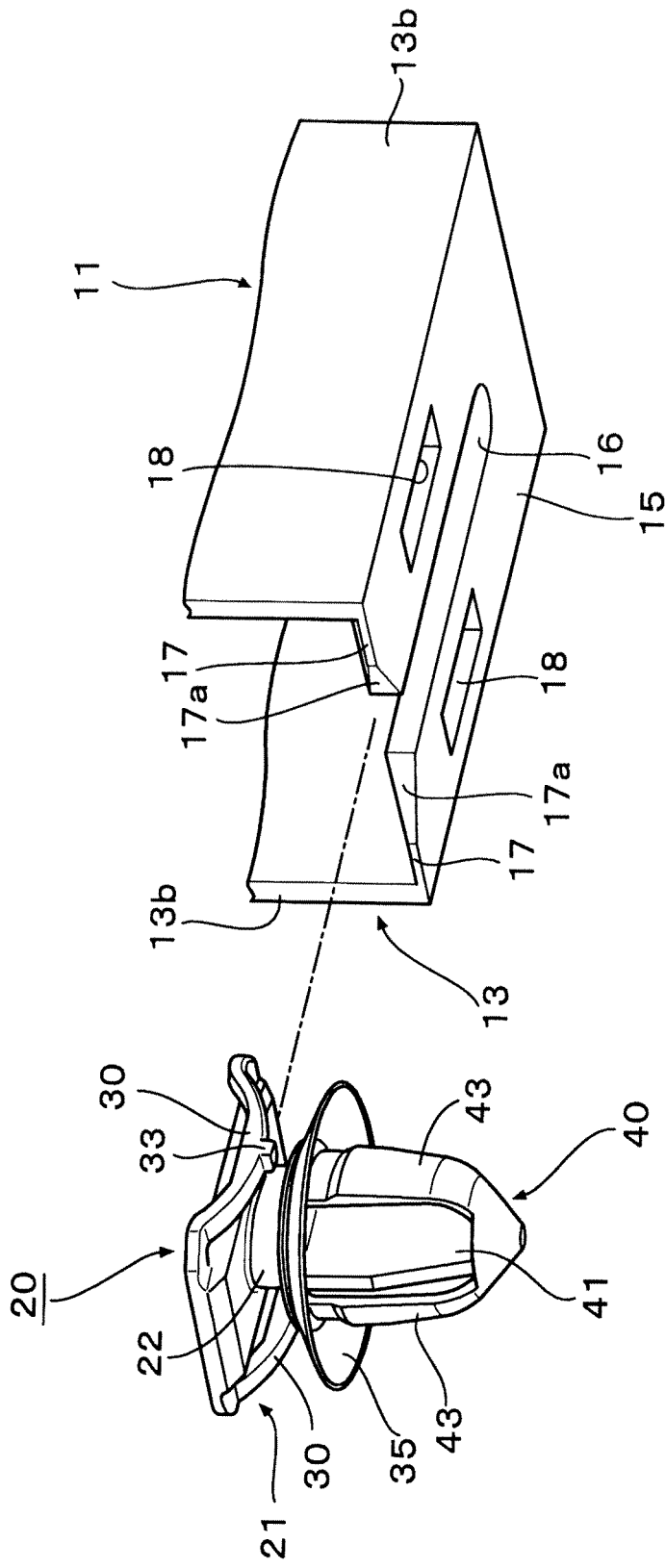
FIG. 1 is a perspective view showing one embodiment of an assembling construction of a clip to a mountable member according to the invention.

Firstly, as FIG. 1 shows, the neck portion 22 and elastic pieces 30, 30 of the clip 20 are registered with the guide grooves 18, 18 and the introduction groove 16 in the mounting seat 15, respectively, and the clip 20 is forced into the pedestal 11 from the opening portion at the front end thereof. Then, the neck portion 22 is gradually inserted into the introduction groove 16 while being guided by the respective inner surfaces 17a, 17a of the tapering walls 17 of the mounting seat 15. As this continues, the neck portion 22 is further forced into the pedestal 11 while being guided by both the tapering walls 17, 17 of the mounting seat 15 and the tapering surface 26a of the first flange portion 26a (refer to FIG. 4). Then, the first flange portion 25 is disposed on the inner side of the mounting seat 15, and the second flange portion 35 is disposed on the outer side of the mounting seat 15. Further, both the elastic pieces 30, 30 are inserted into the pair of guide grooves 18, 18.

As a result, as FIGS. 5A and 5B show, the neck portion 22 is inserted into the introduction groove 16 which is the narrow elongated groove in a registered fashion, whereby the clip 20 is positioned properly with respect to the direction which is at right angles to the inserting direction thereof. In synchronism with this, the first flange portion 25 is brought into abutment with the inner side of the mounting seat 15, while the second flange portion 35 is brought into abutment with the outer side of the mounting seat 15, and further, the elastic pieces 30, 30 are inserted into the pair of guide grooves 18, 18. Thus, the clip 20 can be assembled to the plate-shaped mounting seat 15 with the end portions 32, 32 of the elastic pieces 30, 30 pressed against the corresponding end portions of the guide grooves 18. Similarly, the other clips 20 are assembled to the other mounting seats 15 formed on the mountable member 10.

In this embodiment, since the neck portion 22 has the sectional shape which extends long in the direction in which the introduction groove 16 extends, the insertion of the clip 20 into the introduction groove 16 is restricted depending upon an inserting direction of the clip 20, whereby an erroneous insertion of the clip 20 into the introduction groove 16 can be surely prevented. Since the elastic pieces 30 can be inserted smoothly into the guide grooves 18, the inserting work efficiency of the clip 20 can be improved. And, since the neck portion 22 has the shape described above, the width of the mounting seat 15 can be narrowed while ensuring large rigidity for the neck portion 22.

In this embodiment, since the portions of the mounting seat 15 on the both sides of the introduction groove 16 are formed into the tapering walls 17, 17 which gradually reduce their thicknesses towards the distal ends thereof, as described above, when the neck portion 22 of the clip 20 is introduced to be forced into the introduction groove 16, a distal end of the mounting seat 15 is prevented from being caught on the first flange portion 25 and the second flange portion 35, whereby the clip 20 can smoothly be assembled to the mounting seat 15.

After the clips 20 are assembled to the mounting seats 15 on the mountable member 10 in the way described above, the leg portions 40 of the clips 20 are inserted into the corresponding mounting holes 5 in the support member 1. Then, as FIG. 8 shows, the engagement step portions 43a of the leg portions 40 of the clips 20 are brought into engagement with the circumferential edges on the rear sides of the mounting holes 5, and the circumferential edges f the second flange portions 35 are brought into elastic abutment with circumferential edges of front sides of the mounting holes 5. In this state, the clips 20 are fixedly placed in the corresponding mounting holes 5 without any looseness, whereby the mountable member 10 can be mounted on the support member 1 via the clips 20.

Incidentally, each clip 20 is made to be displaced by a certain distance relative to the mounting seat 15. However, in the event that the clips 20 are displaced individually differently, work is necessary to register the clips 20 individually with the corresponding mounting holes 5, and therefore, there is caused a problem with the inserting work efficiency of the clips 20.

In the assembling construction according to this embodiment of the invention, when the clip 20 is assembled to the mounting seat 15, the elastic pieces 30 are inserted into the corresponding grooves 18, and the end portions 32, 32 of the elastic pieces 30 are pressed against the corresponding end portions of the guide grooves 18 (refer to FIG. 5B). Because of this, when the clip 20 is offset relative to the longitudinal middle positions of the guide grooves 18, the elastic pieces 30 which are brought into press contact with the guide grooves 18 are pressed against the end portions of the guide grooves 18 which are situated in the direction in which the clip 20 is offset and are largely deflected to be deformed, whereby the elastic pieces 30 are brought into press contact with the end portions of the guide grooves 18 more strongly.

The elastic pieces 30 are brought into press contact with the end portions of the guide grooves 18 which are situated in the direction in which the clip 20 is offset more strongly. Therefore, centering forces act in the longitudinal middle positions of the guide grooves 18 (refer to arrows in FIGS. 6B and 7B), whereby the clip 20 is pushed back to the longitudinal middle positions of the guide grooves 18. Thus, as described above, when the clips 20 are mounted in the plural locations on the mountable member 10, the positions of the clips 20 are automatically corrected by the centering action described above. Therefore, the registration of the clips 20 with the corresponding mounting holes 5 in the support member 1 is facilitated, thereby improving the inserting work efficiency of the clips 20.

Incidentally, in Patent Literature 1, the horizontal movement of the clip is restricted by the insertion of the projections of the elastic arms in the V-shaped engagement grooves formed in the mounting seat. However, the looseness of the clip in the vertical direction with respect to the mounting seat cannot be prevented. In contract with this, in the assembling construction of the embodiment according to the invention, the end portions 32, 32 of the elastic pieces 30 which extend from the curved central portions thereof are brought into press contact with the corresponding end portions of the guide grooves 18. Therefore, the looseness of the clip 20 in the vertical direction to the mounting seat 15 can also be surely prevented.

Figure 6A:
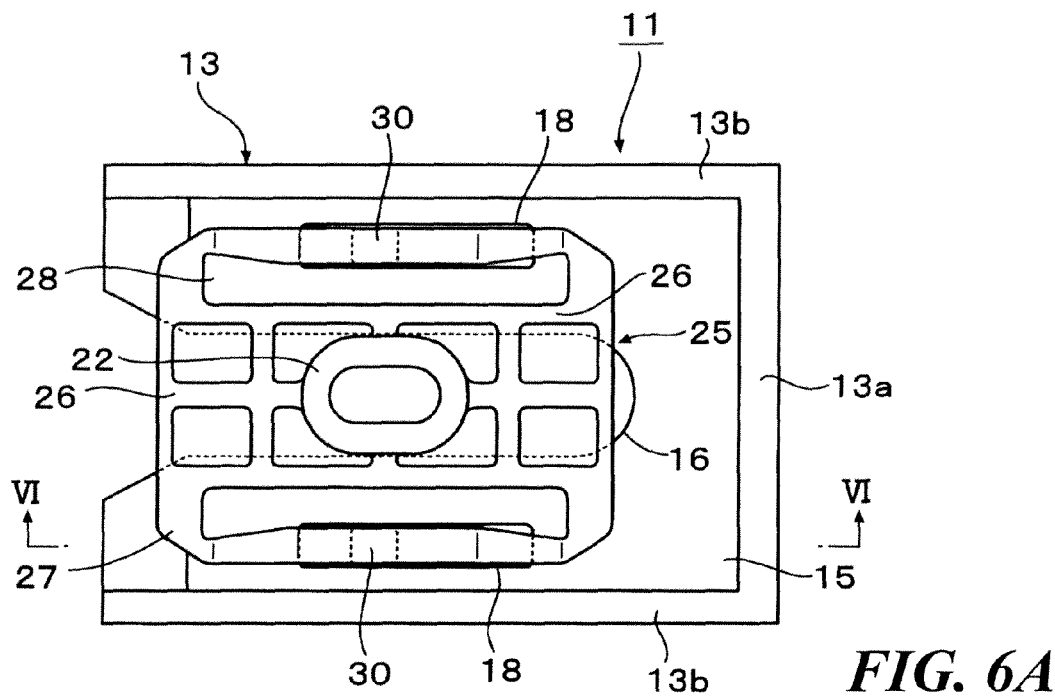
FIGS. 6A and 6B show a state in which the clip is offset to a maximum extent towards a front opening portion in the mounting seat, FIG. 6A being a plan view of the state, FIG. 6B being a partially sectional view taken along the line VI-VI in FIG. 6A.
Figure 6B:
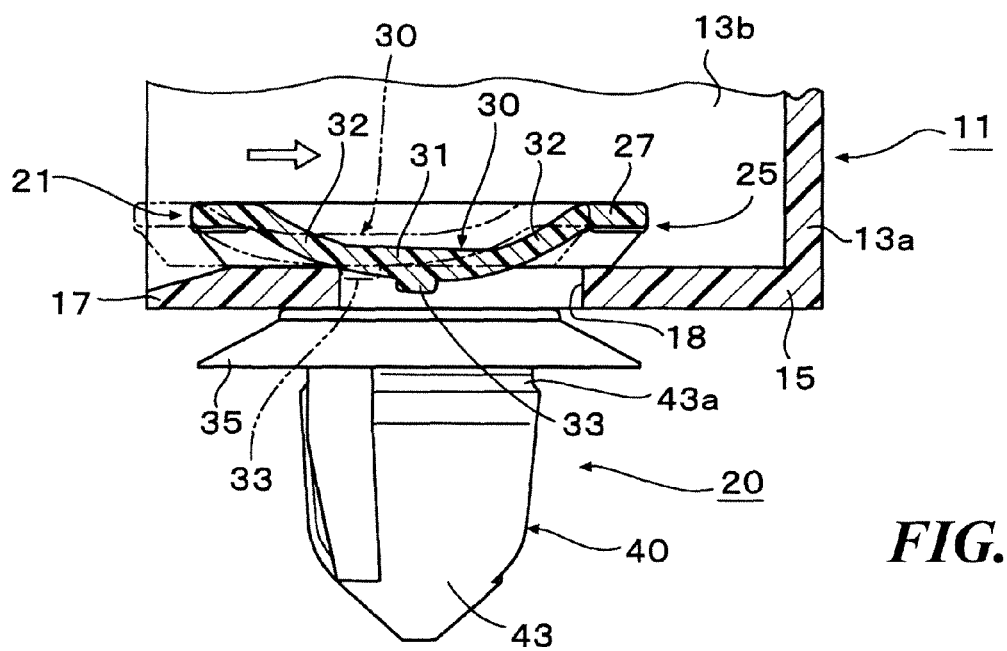
Figure 7A:
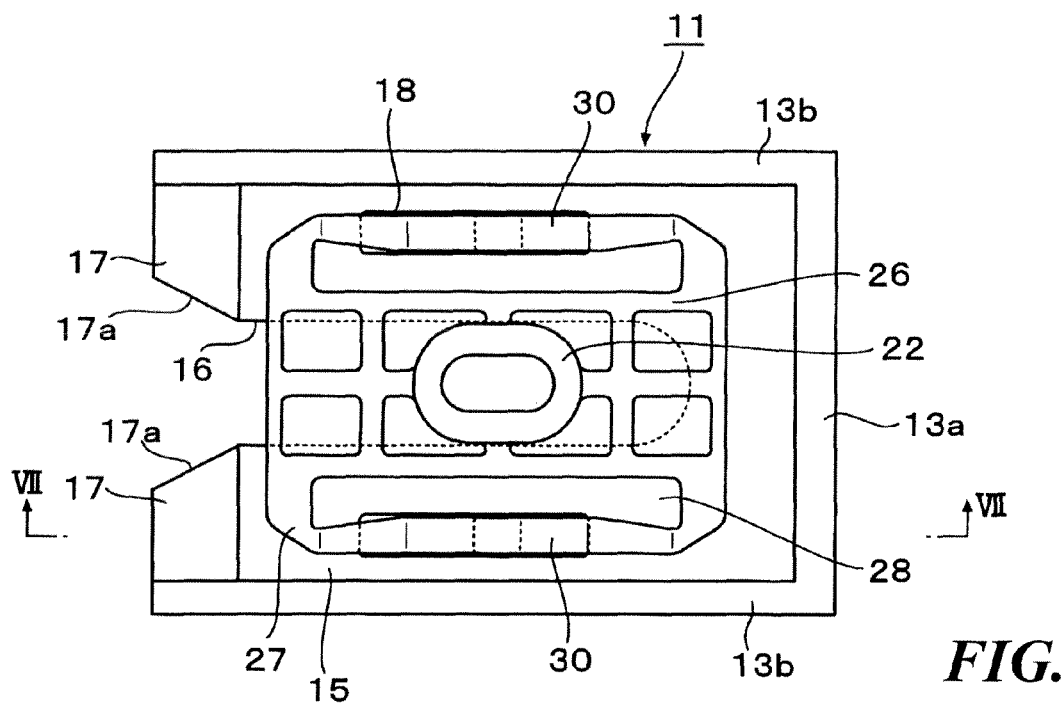
FIGS. 7A and 7B show a state in which the clip is offset to a maximum extent towards a deepest portion in the mounting seat, FIG. 7A being a plan view of the state, FIG. 7B being a partially sectional view taken along the line VII-VII in FIG. 7A.
Figure 7B:
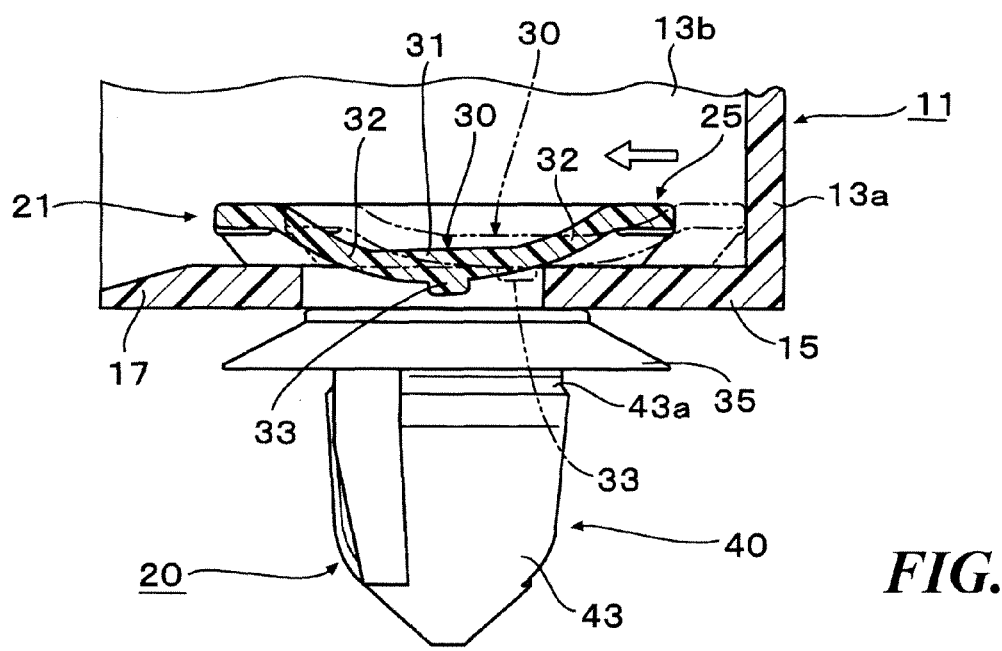

The stopper projections 33 provided on the elastic pieces 30 are also inserted into the guide grooves 18, and therefore, even in the event that the clip 20 is forced to be shifted largely to thereby be dislocated from the introduction groove 16, as indicated by the imaginary lines in FIGS. 6B and 7B, the stopper projections 33 are brought into engagement with the end portions of the guide grooves 18 to thereby restrict a further shift of the clip 20. Thus, the dislocation of the clip 20 from the mounting seat 15 can be surely prevented.

When the leg portions 40 of the clips 20 which are assembled to the mounting seats 15 on the mountable member 10 are inserted into the corresponding mounting holes 5 in the support member, there have been encountered situations in which the leg portions 40 of the clips 20 are not accurately registered with the centers of the mounting holes 5 due to dimension errors of the mountable members 10 and the support members 1 or the effect of thermal expansion of the mountable members 10 (in particular, in the case of a longitudinally long member such as a side spoiler being mounted externally on the vehicle). Even though such situations actually occur, according to the assembling construction of the embodiment according to the invention, the individual clips 20 are allowed to be shifted as required against the centering force, and therefore, by shifting the clips 20 so as to be registered with the corresponding mounting holes 5, the leg portions 40 thereof can be surely inserted into the corresponding mounting holes 5.

The guide grooves 18 with which the elastic pieces 30 are brought into press contact are formed parallel to the introduction groove 16 in the mounting seat 15, and therefore, unlike the "V-shaped" engagement grooves in as Patent Literature 1, the width of the mounting seat 15 can be narrowed, thereby reducing the size thereof.

In this embodiment, at least one guide groove 18 is formed on each side of the introduction groove 16, and the plural elastic pieces 30 are formed for these guiding grooves 18. Therefore, the centering force can be imparted with good balance on the both sides of the introduction groove 16.

The width W2 along the shorter side of the neck portion 22 of the clip is made to substantially match the width W3 of the introduction groove 16 in the mounting seat 15 (refer to FIG. 5A). However, there may be adopted a configuration in which the width W2 of the neck portion 22 is made smaller by the certain length than the width W3 of the introduction groove 16, so as to define a certain space between the neck portion 22 and the introduction groove 16, so that the clip can be shifted a distance equal to the space defined above in a direction which is at right angles to the introduction groove 16. As this occurs, due to the elastic pieces 30 of the clip 20 being inserted into the guide grooves 18, when the clip 20 is shifted in the direction which is at right angles to the introduction groove 16, the elastic pieces 30 are deflected in the transverse direction, and the centering effect is provided by virtue of the elastic restoring force generated in the deflected elastic pieces 30.

Figure 9:
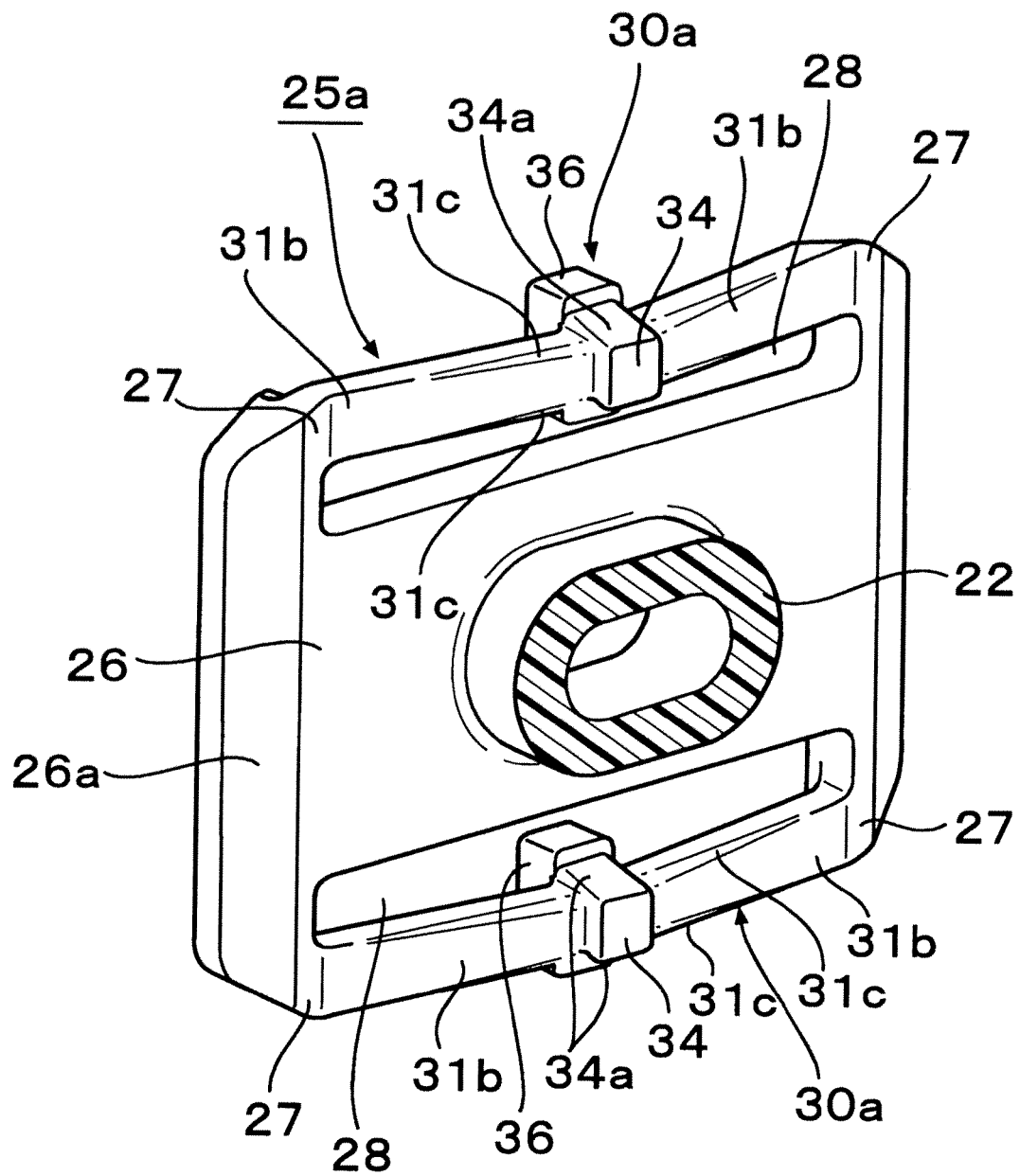
FIG. 9 is an enlarged perspective view of a main part of another embodiment of an assembling construction of a clip to a mountable member according to the invention.
Figure 10:
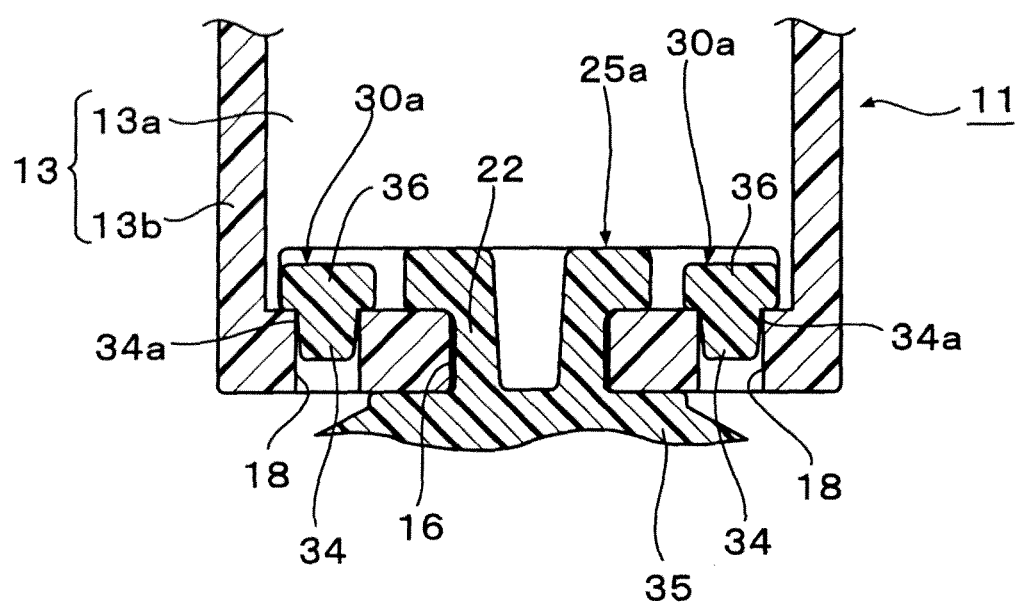
FIG. 10 is a sectional view of a main part of the assembling construction, in a state in which the clip is mounted on a mounting seat.

FIGS. 9 and 10 show another embodiment of another assembling construction of a clip to a mountable member according to the invention. Like reference numerals will be given to portions which are substantially equal to those of the previous embodiment.

An assembling construction according this embodiment differs from the previous embodiment in the construction of a first flange portion of a clip 20. Namely, in a clip 20 according to this embodiment, each of elastic pieces 30a which are provided on a first flange portion 25a is formed of a pair of bent pieces 31b, 31b which are bent towards a direction in which the elastic piece 30a is inserted in a guide groove 18 so as to form a substantially "V-shape" when they are connected together. A stopper projection 34 is provided at a central peak bent portion of the V-shaped elastic piece 30a (a portion where the pair of bent pieces 31b, 31b are connected together) so as to project from a side of the central peak bent portion which is situated in the direction in which the elastic piece 30a is inserted into the guide groove 18. An engagement projection 36 is provided to project from a side of the central peak bent portion which is opposite to the side where the stopper projection 34 is provided so as to be brought into engagement with both longitudinal circumferential edges of each guide groove 18 (refer to FIG. 10). In this embodiment, support pieces 27, 27 which support the elastic piece 30a are formed as thick as a base member 26. Both longitudinal corner portions 31c, 31 of the elastic piece 30a which are situated on a side of the elastic piece 30a from which the elastic piece 30a is inserted into the guide groove 18 are each formed into an arc plane which gradually reduce their radius of curvature from a longitudinal center towards end portions of the elastic piece 30a (a gradually changing R-shape).

Lateral sides 34a, 34a of the stopper projection 34, which face longitudinal lateral sides of the guide groove 18 when the stopper projection 34 is inserted thereinto, slightly project outwards from both lateral sides of the elastic piece 30a (refer to FIG. 9). Both the lateral sides 34a, 34a are formed into tapering planes which taper to approach each other so as to gradually reduce a thickness of the stopper projection 34 defined therebetween as they extend towards a direction in which the stopper projection 34 projects.

In this embodiment, since the lateral sides 34a, 34a of the stopper projection 34 are formed into the tapering planes, when the clip 20 is assembled to a mounting seat 15, the stopper projection 34 can easily be inserted in an interior of the guide groove 18. Both the lateral sides 34a, 34a of the stopper projection 34 are brought into abutment with the corresponding longitudinal sides of the guide groove 18 (refer to FIG. 10), and therefore, the looseness of the elastic piece 30a can be prevented. Thus, the elastic piece 30a can be held firmly in the guide groove 18, whereby the clip 20 can be held without any looseness.

DESCRIPTION OF REFERENCE NUMERALS 1 support member; 5 mounting hole; 10 mountable member; 15 mounting seat; 16 introduction groove; 17 tapering wall; 18 guide groove; 20 clip; 21 head portion; 25, 25a first flange portion; 30, 30a elastic piece; 33, 34 stopper projection; 34a, 34a lateral sides; 35 second flange portion; 40 leg portion.

The invention claimed is:

1. An assembling construction comprising:
a mountable member; and
a clip for fastening the mountable member to a support member by holding a head portion of the clip on a mounting seat of the mountable member while securely fitting a leg portion of the clip in a mounting hole in the support member,
wherein the mounting seat includes:
an introduction groove which is opened at one end for insertion of the clip; and
a guide groove which is a narrow elongated hole and is disposed parallel to the introduction groove,
wherein the head portion of the clip includes:
a first flange portion which is brought into abutment with one side of the mounting seat;
a neck portion which is inserted into the introduction groove; and
a second flange portion which is brought into abutment with an opposite side to the one side of the mounting seat,
wherein the leg portion extends from an opposite side of the second flange portion to the neck portion side, and
wherein the first flange portion includes a strip-shaped elastic piece which is supported at both ends thereof so as to be disposed along the guide groove and so as to be brought into press contact with both end portions of the guide groove by being deformed when the neck portion is inserted into the introduction groove.

2. The assembling construction of claim 1,
wherein the mounting seat includes a plurality of the guide groove,
wherein the first flange portion includes a plurality of the strip-shaped elastic piece,
wherein a plurality of the guide grooves are formed in the mounting seat such that a least one of the guide grooves is formed on each side of, the introduction groove, and wherein a plurality of the strip-shaped elastic pieces are formed correspondingly with the guide grooves.

3. The assembling construction of claim 1,
wherein the neck portion of the clip extends in a direction in which the introduction groove extends further than in a direction which is perpendicular to the direction in which the introduction groove extends and an axial direction of the neck.

4. The assembling construction of claim 1,
wherein the first flange portion further includes a stopper projection which projects from the elastic piece toward the second flange portion so as to be inserted into the guide groove, and
wherein both lateral sides of the stopper projection, which face both lateral sides of the guide groove, are tapered such that a length between the lateral sides decreases as the lateral sides extend in a direction in which the stopper projection projects.

5. The assembling construction of claim 1,
wherein portions of the mounting seat on both sides of the introduction groove are formed into tapering walls having thicknesses which gradually reduce towards an opened direction of the introduction groove.

6. The assembling construction of claim 1, wherein a gap is formed between a portion of the first flange portion and a portion of the elastic piece.

7. The assembling construction of claim 1, wherein the elastic piece includes a curved portion between the ends of the elastic piece.

8. The assembling construction of claim 7, wherein, when the neck portion is disposed in the introduction groove, the curved portion extends from an end thereof toward the guide groove.

9. The assembling construction of claim 1, wherein, when the neck portion is disposed in the introduction groove, a portion of the elastic piece facing the guide groove and a portion of the elastic piece located on a side opposite to the guide groove each approach the guide groove from the ends of the elastic piece.

10. The assembling construction of claim 1, wherein a through-hole is formed between a portion of the elastic piece and a portion of the first flange portion.

11. The assembling construction of claim 1, wherein the elastic piece has a curved bow shape which is convex in a direction in which the elastic piece is inserted into the guide groove.

12. The assembling construction of claim 1, wherein the elastic piece is formed such that, when inserted into the guide groove, if the elastic piece is offset with respect to a longitudinally middle position of the guide grooves, then the elastic piece is deformed so as to generate a centering force so as to push the elastic piece towards the longitudinally middle position of the guide groove.

13. An assembling construction comprising:
a mountable member; and
a clip for fastening the mountable member to a support member by holding a head portion of the clip on a mounting seat of the mountable member while securely fitting a leg portion of the clip in a mounting hole in the support member,
wherein the mounting seat includes:
an introduction groove which is opened at one end for insertion of the clip; and
a guide groove which is a narrow elongated hole and is disposed parallel to the introduction groove,
wherein the head portion of the clip includes:

a first flange portion which is brought into abutment with one side of the mounting seat;

a neck portion which is inserted into the introduction groove; and a second flange portion which is brought into abutment with an opposite side to the one side of the mounting seat, wherein the leg portion extends from an opposite side of the second flange portion to the neck portion side, wherein the first flange portion includes a strip-shaped elastic piece which is supported at both ends thereof so as to be disposed along the guide groove and so as to be brought into press contact with both end portions of the guide groove by being deformed when the neck portion is inserted into the introduction groove, and wherein the both ends of the elastic piece at which the first flange portion supports the elastic piece are positioned outwardly of the both end portions of the guide groove, such that the both ends of the elastic piece sandwich the both end portions of the guide groove in a direction in which the neck portion is inserted into the introduction groove.

* * * * *